US009428902B1

(12) United States Patent
LoFranco et al.

(10) Patent No.: US 9,428,902 B1
(45) Date of Patent: Aug. 30, 2016

(54) BRACKET FOR MULTI-STORY BUILDINGS (71) Applicants: Randall John LoFranco, Norco, CA (US); Brian Alfonso Larrabure, Chatsworth, CA (US)

(72) Inventors: Randall John LoFranco, Norco, CA (US); Brian Alfonso Larrabure, Chatsworth, CA (US)

(*) Notice: Subject to any disclaimer, the term of this patent is extended or adjusted under 35 U.S.C. 154(b) by 0 days.

(21) Appl. No.: 14/932,785

(22) Filed: Nov. 4, 2015

Related U.S. Application Data (60) Provisional application No. 62/175,053, filed on Jun. 12, 2015.

(51) Int. Cl.
*E04H 1/00* (2006.01)
*E04B 1/38* (2006.01)
*E04C 5/12* (2006.01)
*E04B 1/41* (2006.01)
*F16M 13/02* (2006.01)
*E04B 1/18* (2006.01)
*E04B 2/56* (2006.01)
*E04C 3/30* (2006.01)

(52) U.S. Cl.
CPC ............... *E04B 1/40* (2013.01); *E04B 1/185* (2013.01); *E04B 2/56* (2013.01); *E04C 3/30* (2013.01); *F16M 13/02* (2013.01); *E04B 2001/405* (2013.01)

(58) Field of Classification Search
CPC ........... E04B 1/40; E04B 2/56; E04B 1/185; E04B 2001/405; E04B 1/2604; E04B 1/2608; E04B 2001/2684; E04B 2001/2696; F16M 13/02; E04C 3/30
USPC ...................................................... 52/236.6
See application file for complete search history.

(56) References Cited

U.S. PATENT DOCUMENTS

| 2,611,160 | A | * | 9/1952 | Hanesse | A63H 33/107 182/228.1 |
|---|---|---|---|---|---|
| 2,768,434 | A | * | 10/1956 | Taylor | E04B 1/2604 29/525.04 |
| 3,188,696 | A | * | 6/1965 | Earhart | E04B 1/2612 403/230 |
| 4,330,971 | A | * | 5/1982 | Auberger | E06B 1/6092 403/232.1 |
| 4,875,314 | A | | 10/1989 | Boilen | |
| 4,964,253 | A | * | 10/1990 | Loeffler | E04B 7/06 403/232.1 |
| 5,364,214 | A | * | 11/1994 | Fazekas | E04H 9/02 411/354 |
| 5,375,384 | A | * | 12/1994 | Wolfson | E04B 1/0007 52/295 |
| 5,535,561 | A | * | 7/1996 | Schuyler | E04B 1/0007 411/392 |

(Continued)

*Primary Examiner* — Joshua J Michener
*Assistant Examiner* — Keith Minter
(74) *Attorney, Agent, or Firm* — Knobbe, Martens, Olson & Bear LLP (57) ABSTRACT

A bracket for a single- or multi-story building is disclosed. The building can include horizontal building member, such as a sill plate, and a bracket comprising a base section and first and second arms extending transversely from the base section. The first and second arms can be spaced apart from one another. The base section can include an aperture. A pair of studs can be disposed between the first and second arms. An outer side surface of a first stud of the pair of studs can be connected to the first arm and an outer side surface of a second stud of the pair of studs can be connected to the second arm. A tie member, such as a threaded rod, can extend substantially parallel to and positioned between the first stud and the second stud and can pass through the opening of the base section and into the horizontal building member.

30 Claims, 11 Drawing Sheets

(56) References Cited

U.S. PATENT DOCUMENTS

| | | | |
|---|---|---|---|
| 6,088,982 A * | 7/2000 | Hiesberger | E04B 1/2608 403/231 |
| 6,389,767 B1 | 5/2002 | Lucey et al. | |
| 6,513,290 B2 * | 2/2003 | Leek | E04B 1/2604 403/232.1 |
| 6,625,945 B2 | 9/2003 | Commins | |
| 6,715,258 B1 | 4/2004 | Mueller | |
| 7,150,132 B2 | 12/2006 | Commins | |
| 7,287,355 B2 | 10/2007 | Commins | |
| 7,296,386 B2 | 11/2007 | Leek | |
| 7,665,257 B2 | 2/2010 | Posey | |
| 7,905,066 B2 | 3/2011 | Pryor et al. | |
| 8,511,019 B2 | 8/2013 | Espinosa | |
| 2003/0230032 A1 | 12/2003 | Shahnazarian et al. | |
| 2004/0040236 A1 * | 3/2004 | Adams | E02D 27/02 52/293.3 |
| 2005/0284057 A1 | 12/2005 | Commins | |
| 2006/0037256 A1 * | 2/2006 | Pryor | E04B 2/707 52/167.1 |
| 2009/0107082 A1 * | 4/2009 | Commins | E04B 1/2604 52/745.21 |
| 2010/0058681 A1 * | 3/2010 | Lucey | E04B 1/2604 52/167.3 |
| 2012/0304589 A1 * | 12/2012 | Commins | E04B 1/2604 52/745.21 |
| 2014/0245674 A1 * | 9/2014 | Harrison | E04B 1/26 52/204.2 |
| 2016/0002912 A1 * | 1/2016 | Doupe | E04B 1/2604 52/702 |

* cited by examiner

BRACKET FOR MULTI-STORY BUILDINGS

CROSS-REFERENCE TO RELATED APPLICATIONS

This application claims priority to U.S. Provisional Patent Application No. 62/175,053, filed on Jun. 12, 2015, the contents of which are incorporated by reference herein in their entirety and for all purposes.

BACKGROUND

1. Field of the Invention

The field relates to a bracket for securing studs in single- or multi-story buildings.

2. Description of the Related Art

Constructing single- or multi-story buildings can be an expensive and time-consuming activity. For example, in some buildings, a frame for a wall may include multiple studs that are nailed or otherwise secured to a sill which can be disposed along the floor or ceiling as part of a larger wall structure. The builder often uses holddowns to secure the studs to the building foundation, and/or to other holddowns on adjacent floors. Some holddowns can be expensive and complicated to assemble, and not suitable for two- to five-story buildings. For example, the builder may use multiple bolts and fasteners to assemble the holddown and secure the studs to the foundation. An example of a holddown connected between closely spaced studs is described in U.S. Pat. No. 6,389,767, which is incorporated by reference herein. Accordingly, there remains a continuing need for improved devices and methods for installing a frame of multiple studs in a building.

SUMMARY

In one embodiment, a bracket for a holddown is disclosed. The bracket can include a base section sized and shaped to extend over end surfaces of a pair of spaced apart studs, the base section including an aperture to receive a rod therethrough. First and second arms can extend from the base section. the first and second arms can be spaced apart to extend over outer side surfaces of the pair of spaced studs, the first and second arms having a plurality of fastener openings.

In another embodiment, a frame for a building is disclosed. The frame can comprise a bracket comprising a base section and first and second arms extending transversely from the base section. The first and second arms can be spaced apart from one another, the base section comprising an aperture. A pair of studs can be spaced from one another and disposed between the first and second arms. An outer side surface of a first stud of the pair of studs can be connected to the first arm and an outer side surface of a second stud of the pair of studs can be connected to the second arm.

In yet another embodiment, a method of manufacturing a building is disclosed. The method can comprise inserting first and second studs between first and second arms of a bracket, the first and second arms extending from a base section of the bracket. The method can include spacing the first and second studs from one another such that there is a stud spacing between respective inner side surfaces of the first and second studs. The method can include securing an outer side surface of the first stud to the first arm. The method can include securing an outer side surface of the second stud to the second arm.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Specific implementations of the invention will now be described with reference to the following drawings, which are provided by way of example, and not limitation.

DETAILED DESCRIPTION

Various embodiments of a bracket for multi-story buildings are disclosed herein. The embodiments disclosed herein can utilize a single U-shaped bracket with simple fasteners to secure multiple studs (e.g., a pair of studs, or more than two studs) in a frame of a building. The arrangements disclosed herein can advantageously enable the efficient and cost-effective assembly of single- or multi-story buildings that can withstand high loading conditions (e.g., accumulated vertical loads of up to 50,000 lbs). Embodiments are applicable to wood or metal framing elements for building construction.

For example, in some embodiments, a U-shaped bracket can be used to secure two adjacent but spaced studs to a building foundation, e.g., by way of a wall frame element which is disposed along or on the foundation of the building. The U-shaped bracket can include a base section, and two arms extending transversely from the base section and spaced apart from one another sufficiently to accommodate therebetween two studs, where the inner surfaces of the studs are spaced apart from one another. The studs may have a larger, major side surface and a smaller, minor side surface. For example, standard 2"×4" studs may have a major side surface having a width of about 3.5" and a minor side surface having a width of about 1.5". In some embodiments, a pair of studs may be positioned between the two arms such that the arms abut the major side surfaces of each stud, while the base section extends over the end surfaces of the studs (with or without an intervening plate washer). As illustrated herein, each arm of the bracket can be positioned on an outer major side surface of the respective stud, e.g., the large side surfaces of the studs that face away from one another. In other embodiments, the arms may abut the smaller, minor side surfaces of the studs. The studs can be fastened to the bracket by way of screws, nails, etc. The use of simple fasteners such as wood screws may provide various cost advantages as compared with more complicated fasteners, such as nut-and-bolt arrangements. The bracket may be connected to a horizontal building member with a connector, such as a screw, a nail, a bolt, or a welded joint. The horizontal building member can form part of a floor or ceiling, or can form part of a wall structure (e.g., a sill) disposed adjacent a ceiling or a floor. In some arrangements, the studs and the horizontal building member may comprise wood. In other embodiments, the studs and/or the horizontal building member may comprise a metal, such as steel, aluminum, etc.

The arms can be spaced apart by a suitable predetermined distance. For example, many buildings are built having studs spaced apart by a standard distance, which can define, in combination with the widths of the two studs, the separation between the arms of the bracket. For example, the arms of the bracket may be spaced apart by a separation distance of at least 4 inches, for example, by a separation distance of at least 6 inches. The separation distance between the arms can be in a range of 4 inches to 27 inches, or more particularly, in a range of 6 inches to 27 inches, for example, in a range of 6 inches to 12 inches. In some arrangements, the arms can be spaced by a separation distance of 5 inches to 8 inches, e.g., in a range of 5 inches to 7 inches. Other separation distances may be suitable.

The bracket may comprise a metal, such as steel. In various arrangements, the bracket can comprise 12 gauge steel, 13 gauge steel, 14 gauge steel, 15 gauge steel, 16 gauge steel, 17 gauge steel, 18 gauge steel, 19 gauge steel, 20 gauge steel, etc., or ranges between any two of the above steel weights or thicknesses. In various embodiments, the thickness of the bracket can be at least $\frac{1}{8}$ inch thick, for example, at least $\frac{1}{4}$ inch thick. For example the thickness of the bracket can be in a range of $\frac{1}{8}$" to 1", or in a range of $\frac{1}{4}$" to 1". For other materials, such as aluminum, fiberglass, plastic, carbon-fiber composites, etc., the skilled artisan can readily determine equivalent weights or thicknesses to resist equivalent loads. The studs can comprise wood, e.g., pine, oak, etc. In some embodiments, the studs can comprise a metal, such as steel, aluminum, etc.

As explained herein, the studs may rest on a plate washer disposed between the two arms of the bracket. In other arrangements, the plate washer can be positioned on the base section of the bracket between the studs. The plate washer can assist in bearing the load from the building. In still other embodiments, no plate washer may be used at all. The plate washer and the base section of the bracket may comprise an opening sized and shaped to receive an elongate tie member. The elongate tie member can comprise a cable or a rod, which can be a threaded rod, particularly an all-thread rod. The tie member (e.g., rod or cable) can be inserted through the opening to secure the bracket and studs to the foundation of the building. A nut can be used to tighten the rod.

Advantageously, the embodiments disclosed herein can be used in single- or multi-story buildings. For example, in some arrangements, as explained herein, the tie member (e.g., a rod) can pass from floor-to-floor to enhance the stability of the building. In such arrangements, the tie member can pass through a first bracket located on one story of the building (e.g., on the floor or ceiling of a particular story) and also through a second bracket located on another story of the building (e.g., on the adjacent ceiling or floor of the other story). For the bottom floor of a building, the tie member may extend into the foundation (e.g., concrete).

To assemble a portion of the building, the builder may provide a pre-assembled frame member including a plurality of studs that have been fastened to the bracket. In other embodiments, the studs may be fastened to the bracket at the building site. The builder may nail (or otherwise fasten) the base section of the bracket to the plate washer and the studs. In some arrangements, the plate washer may not be directly fastened to the bracket, but may lie between the arms of the bracket so that the studs can bear against the plate washer. In still other arrangements, a plate washer may not be used. In other embodiments, the base section of the bracket may be thickened, roughened, and/or corrugated so that the base section of the bracket may act as the plate washer to support the studs. The studs, bracket, and plate washer may be lifted perpendicular to a horizontal building member, such as a sill which may be configured to be disposed along a floor or a ceiling of the building. The studs, bracket, and plate washer may be connected to the sill off-site and transported to the building for installation. In other arrangements, the studs, bracket, and plate washer may be connected to the horizontal building member during installation in the building. A rod may be inserted through openings in the base section of the bracket and the plate washer. A connector, such as a nut, can be threaded onto the rod to tighten the assembly.

Thus, the embodiments disclosed herein can advantageously enable the manufacture of single- or multi-story buildings at reduced costs and improved efficiency as compared with other techniques. For example, it can be relatively inexpensive to use simple fasteners to connect a pair of studs to a single U-shaped bracket, as compared with other techniques which utilize more expensive fasteners and more complicated assembly methods. Furthermore, in some embodiments, the frame members can be assembled offsite, e.g., the studs can be connected to the U-shaped bracket and plate washer and carried to the building site for efficient assembly.

Figure 1:
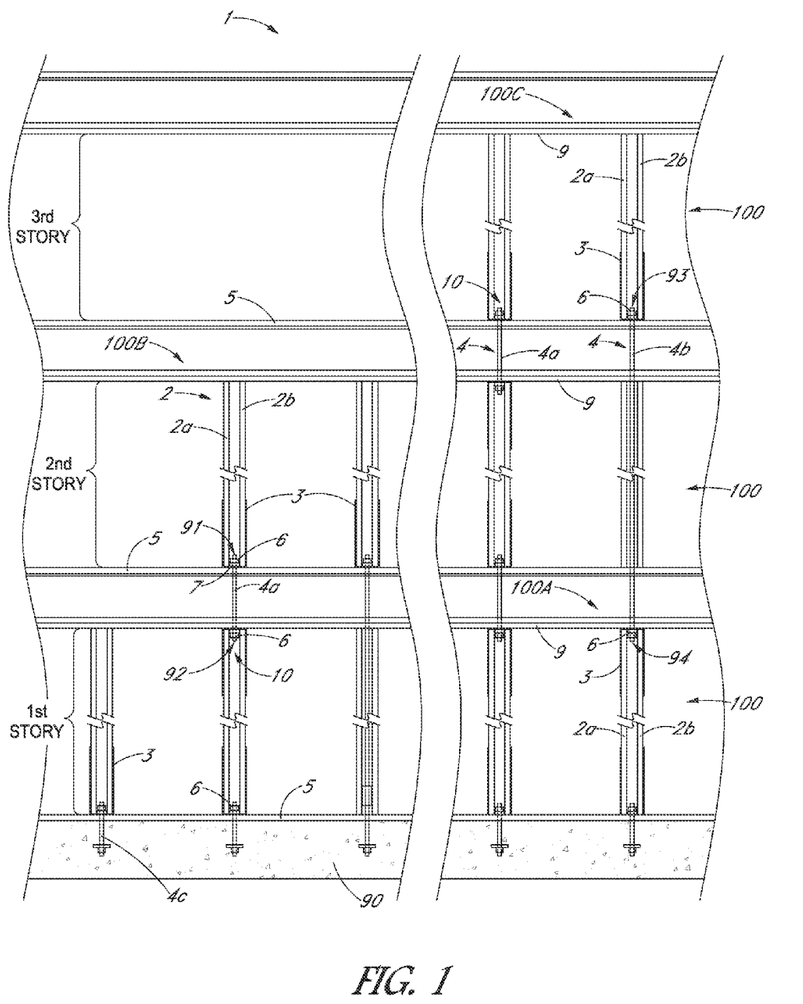
FIG. 1 is a schematic side cross-sectional view of a multi-story building, in accordance with one embodiment.

FIG. 1 is a schematic side cross-sectional view of a multi-story building 1, in accordance with one embodiment. The building 1 of FIG. 1 has three stories, but it should be appreciated that any suitable number of stories may be built. Each story of the building 1 can be built by assembling one or more frames 100 (which at least partially define the walls of the building 1) and connecting the frames 100 together by way of corresponding holddown assemblies 10. For example, one or more frames 100A for the first story of the building 1 can be secured to a foundation 90 of the building 1. The one or more frames 100B for the second story of the building 1 can be connected to the frame(s) 100A for the first story by way of one or more holddown assembly (assemblies) 10, and one or more frames 100C for the third story can be connected to the frame(s) 100B for the second story by way of one or more additional holddown assembly (assemblies) 10. In some embodiments, the frames 100 can be pre-assembled off-site and can be incorporated into the building 1 at the building site. Pre-assembling the frames 100 off-site can enable workers to efficiently construct the building and lower labor costs. In other embodiments, the frames 100 can be built on site as the building is being constructed. It should be appreciated that, although various embodiments are disclosed in the context of a multi-story building, and are particularly advantageous for the construction of 3-4 story buildings, the bracket 3 and associated components may also be used with a single story building.

Each frame 100 of the building 1 can include a pair 2 of studs 2a, 2b and a bracket 3 to which the studs 2a, 2b are secured. In some embodiments, the frame 100 can also include one or more horizontal building members, such as a lower sill 5 (for example, to be disposed along a floor of the building) and/or an upper sill 9 (for example, to be disposed along a ceiling of the building). The horizontal building members can form part of a wall, floor or ceiling. In embodiments as shown, where the horizontal building members are sill plates, the sills and the studs can form or define part of a wall structure of the building when installed. In such embodiments, the studs 2a, 2b can be connected to the bracket 3 by way of a suitable fastener (such as a screw, nail, bolt, weld joint, etc.). The bracket 3 can be connected to a corresponding lower sill 5 and/or upper sill 9 by way of a suitable fastener (such as a screw or nail). The studs 2a, 2b, the lower sill 5, and the upper sill 9 can comprise wood posts in various embodiments, such as 2×4 boards, 4×4 boards, etc. Any suitable type of wood can be used for the studs 2a, 2b, the lower sill 5, and the upper sill 9, such as pine, oak, etc. In other arrangements, the studs 2a, 2b, lower sill 5, and upper sill 9 can comprise a metal, such as steel, aluminum, etc.

The studs 2a, 2b and bracket 3 from one story (e.g., the first story) can be secured to corresponding studs 2a, 2b and bracket 3 from another story (e.g., the second or third story) by way of a tie member, such as the illustrated a rod 4, and a connector 6. Although the tie member of FIG. 1 is illustrated as the rod 4, in other embodiments, the tie member can comprise a cable or other suitable member. For example, a short rod 4a can connect two frames 100 that are disposed on adjacent stories, such as the first and second stories of the building 1. As shown in FIG. 1, a first end portion 91 of the short rod 4a can connect to the bracket 3 on the second story, while a second end portion 92 of the short rod 4a can connect to the bracket 3 on the first story. A plate washer 7 can be disposed within each bracket 3 and can help support the vertical loading from the building 1. Connectors 6 (such as a nut) can be threaded and tightened on the first and second end portions 91, 92 of the short rod 4a to secure the frame 100B on the second story to the frame 100A on the first story.

Further, in some embodiments, a long rod 4b can be used to connect frames that are disposed on non-adjacent stories of the building 1. For example, as shown in FIG. 1, a first end portion 93 of the long rod 4b can be coupled with a bracket 3 on the third story of the building 1. A second end portion 94 of the long rod 4b can be coupled with a bracket 3 on the first story of the building 1. Respective connectors 6 (such as a nut) can be threaded and tightened to secure the frame 100C of the third story to the frame 100A of the first story. A ground rod 4c and connector 6 can connect the one or more frames 100A of the first story to the foundation 90. The bracket 3, fasteners, and plate washer 7 coupled with the lower sill 5 on the first story of the building 1 can adequately support the vertical building loads of the illustrated three-story building. For example, in some arrangements, each story of the building 1 can contribute about 5,000 pounds of loading, such that the brackets 3 and plate washers 7 disposed on the first story of the building 1 support about 15,000 pounds of vertical loading for the three-story building schematically illustrated in FIG. 1. In various embodiments, the bracket 3 can support loads in a range of 1 lb to 40,000 lbs, e.g., up to about 25,000 lbs.

FIGS. 2A-2D are schematic perspective views of the bracket 3, according to various embodiments. The bracket 3 can be generally U-shaped and can include a base section 20 and a pair 24 of arms 24a, 24b extending transversely from the base section 20. An aperture 21 can be formed through the base section 20. The aperture 21 can be sized and shaped to receive the rod 4 (e.g., any of rods 4a-4c) described above in connection with FIG. 1. The base section 20 may also include a plurality of openings 33 for receiving fasteners (such as screws or nails) which can be used to secure the bracket 3 to one or more of a lower sill 5, an upper sill 9, and/or a plate washer 7. Further, each arm 24a, 24b can include a plurality of fastener openings 22 through which fasteners (e.g., screws or nails) can be received to secure the arms 24a, 24b to respective studs 2a, 2b.

The bracket 3 can have a length l which defines a separation distance between the two spaced arms 24a, 24b. The length l can be selected to provide for a predetermined spacing between the pair 2 of studs 2a, 2b. For example, the length l can be defined between inner surfaces of the arms 24a, 24b. In some embodiments, the length l or separation distance can be at least 4 inches, for example, the length l or separation distance can be at least 6 inches. The separation distance between the arms can be in a range of 4 inches to 27 inches, e.g., in a range of 6 inches to 27 inches, for example, in a range of 6 inches to 12 inches. In some arrangements, the separation distance can be in a range of 5 inches to 11 inches, in a range of 5 inches to 9 inches, or in a range of 6 inches to 9 inches. In some arrangements, the arms can be spaced by a separation distance of in a range of 5 inches to 8 inches, or more particularly in a range of 5 inches to 7 inches. The bracket 3 can also have a width w which can be defined as the width of each arm 24a, 24b. The width w of the bracket 3 can be sized to fit against the major surfaces of the studs 4a, 4b. The width w can be in a range of 2 inches to 8 inches, or in a range of 2 inches to 6 inches. In some embodiments, the width w of the bracket 3 can be in a range of 3 inches to 8 inches, or more particularly, in a range of 4 inches to 6 inches. In some embodiments, the width w can be in a range of 2.5 inches to 3.5 inches, e.g., about 3 inches. In other embodiments, the width w can be in a range of 4.5 inches to 5.5 inches, e.g., about 5 inches. The width w can match the width of the studs 2a, 2b to be accommodated within the bracket 3.

Figures 2A, 2B, 2C:
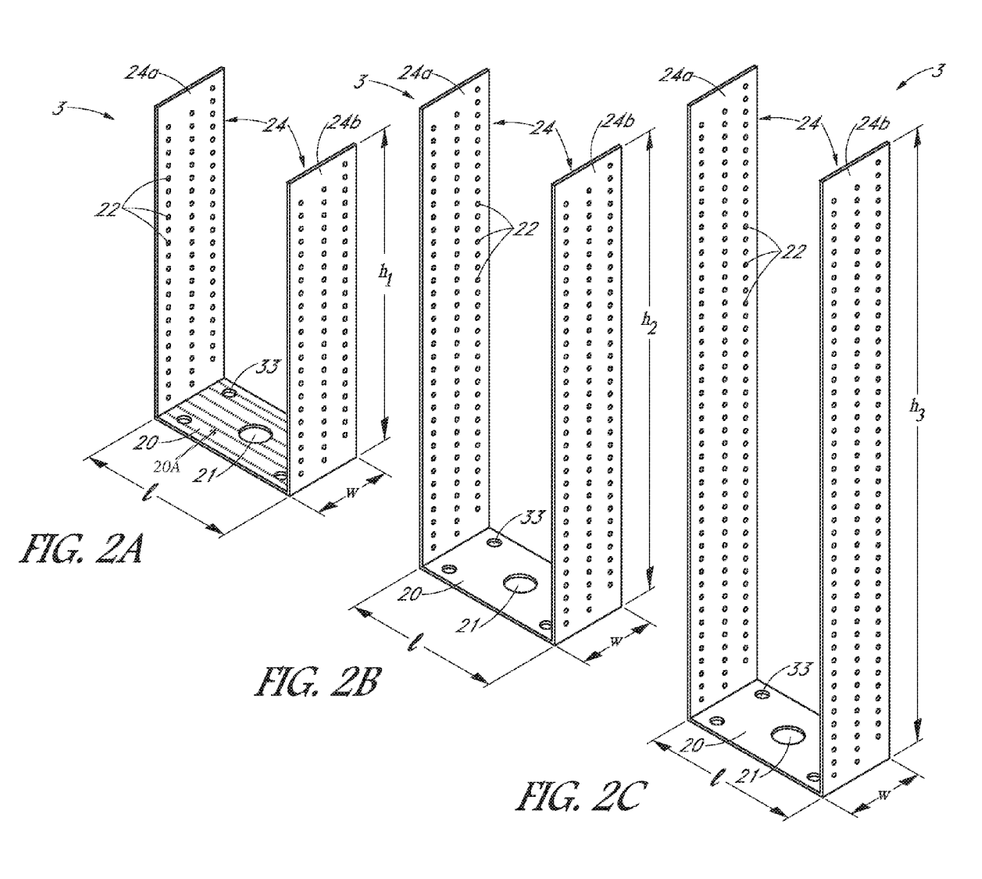
FIGS. 2A-2D are schematic perspective views of brackets according to various embodiments.

The height h of the bracket 3 can be any suitable height. For example, as shown in FIGS. 2A-2D, the bracket 3 may have a relatively small height $h_1$ (FIGS. 2A and 2D), an intermediate height $h_2$ (FIG. 2B), or a relatively large height $h_3$ (FIG. 2C). A bracket 3 with a relatively small height $h_1$ may support fewer fasteners along the arms 24 than a bracket 3 with an intermediate height $h_2$ or a relatively large height $h_3$, which in turn may support a smaller load than brackets with the intermediate or larger heights.

The bracket 3 may comprise a metal, such as steel, aluminum, etc. In various arrangements, the bracket can comprise 12 gauge steel, 13 gauge steel, 14 gauge steel, 15 gauge steel, 16 gauge steel, 17 gauge steel, 18 gauge steel, 19 gauge steel, 20 gauge steel, etc., or ranges between any two of the above steel weights or thicknesses. In various embodiments, the thickness of the bracket 3 can be at least ⅛ inch thick, for example, at least ¼ inch thick. For example the thickness of the bracket 3 can be in a range of ⅛" to 1", or in a range of ¼" to 1". For other materials, the skilled artisan can readily determine equivalent weights or thicknesses to resist equivalent loads. In other embodiments, the bracket 3 can comprise other structural materials, such as fiberglass, plastic, or a carbon fiber composite material.

Figure 2D:
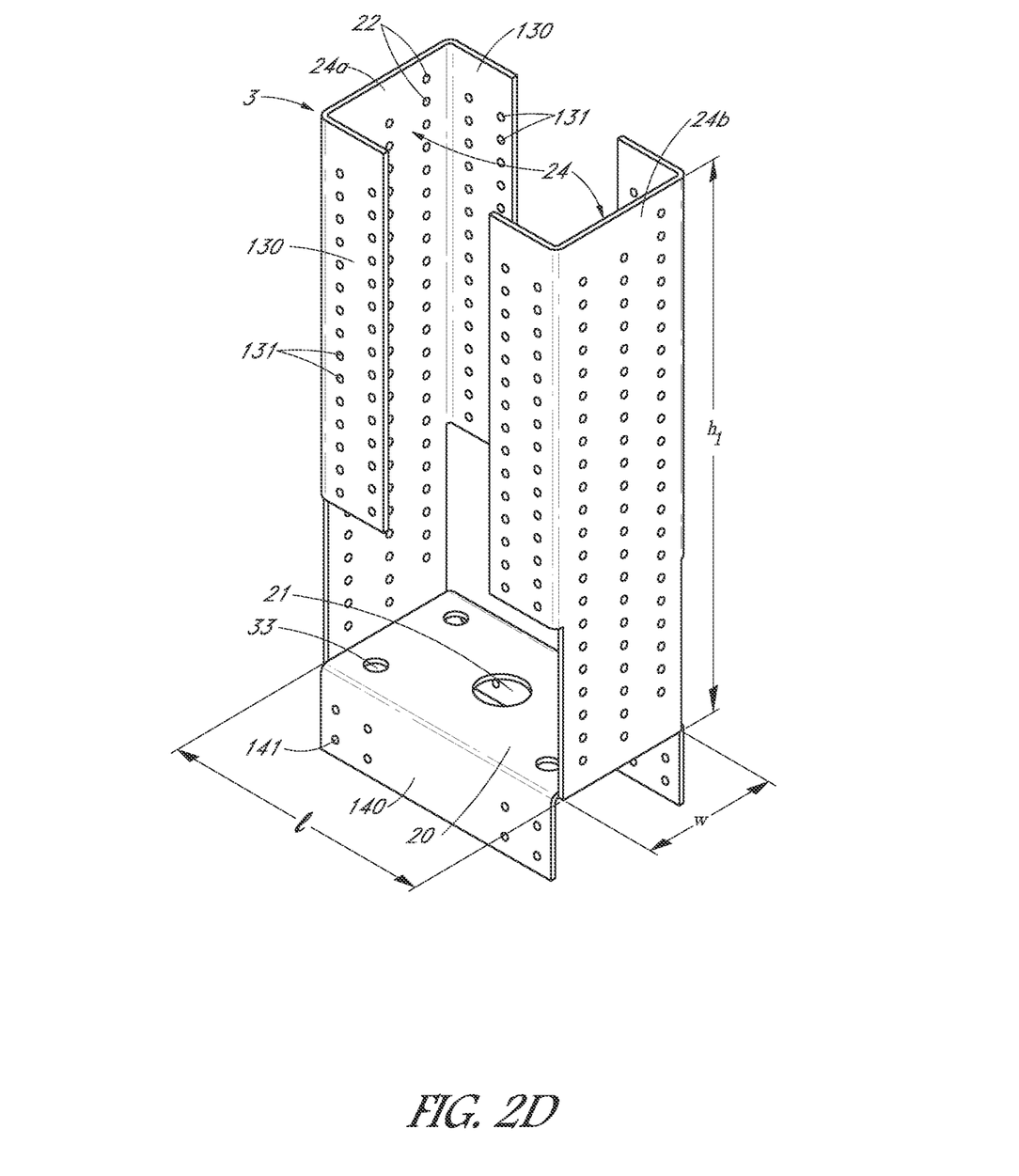

Furthermore, the bracket 3 of FIG. 2D illustrates another arrangement in which the bracket 3 can be connected to the studs 2a, 2b and the corresponding horizontal building member (e.g., sill plate). For example, the bracket 3 can include one or more flanges 130 (e.g., a pair of flanges) extending inwardly from each arm 24a, 24b of the bracket 3. Thus, as shown in FIG. 2D, each flange 130 can extend from outer ends of the corresponding arm 24a or 24b inwardly towards the opposing arm. The flanges 130 can include one or more flange openings 131 through which corresponding flange fasteners (such as screws, nails, etc.) may be inserted to secure the flanges 130 to the studs 2a, 2b. The flanges 130 can comprise a planar piece of metal coupled to or formed with the arms 24a, 24b. Although a pair of opposing flanges 130 is shown to be extending from each arm 24a, 24b, it should be appreciated that, in some embodiments, only one flange 130 may extend from a particular arm 24a.

Moreover, the bracket 3 of FIG. 2D can include one or more tabs 140 extending downwardly from the base section 20 of the bracket 3. The tabs 140 can be coupled to or formed with the base section 20 and can extend transversely relative to the base section 20. In some embodiments, the tabs 140 can comprise a planar piece of metal. The tabs 140 may extend the full width of the base section 20 in some arrangements. In other arrangements, the tabs 140 may extend only partially along the width of the base section 20. In some embodiments, for example, multiple tabs 140 may be disposed and spaced apart from one another along one side of the base section 20. Although a pair of tabs 140 is illustrated in FIG. 5D, it should be appreciated that, in other embodiments, only a single tab 140 may extend downwardly from the base section 20. The tabs 140 can include one or more tab apertures 141 sized and shaped to receive corresponding tab fasteners (such as screws, nails, etc.). The tab fasteners can be used to secure the tabs 140 (and thereby the bracket 3) to a horizontal building member or sill.

Furthermore, although the tabs 140 are shown in FIG. 2D as extending downwardly from the base section 20, in other embodiments, the tabs 140 can extend from other portions of the bracket 3 which may be suitable for fastening the bracket 3 to a horizontal building member (e.g., sill). For example, in some embodiments, horizontally-extending tab(s) may extend outwardly from the outer surfaces of one or both of the arms 24a, 24b, e.g., at or near where the arms 24a, 24b join or extend from the base section 2. Such outwardly-extending tabs may extend away from the bracket by a suitable distance and may comprise one or more apertures through which fasteners can be inserted to secure the outwardly-extending tabs (and thereby the bracket) to a top surface of the horizontal building member.

Figure 3A:
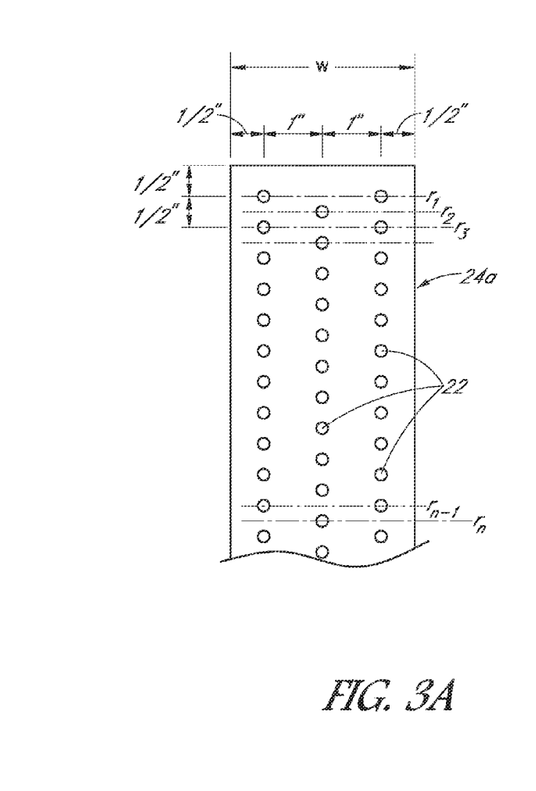
FIG. 3A is a side view of a portion of an arm of a bracket, according to one embodiment.

FIG. 3A is a side view of a portion of an arm 24a of a bracket 3, according to one embodiment. In particular, the bracket 3 of FIG. 3A can have a width of about 3 inches and can have a plurality of rows $r_1 \ldots r_n$ of fastener openings 22. The fastener openings 22 can be sized and shaped to receive fasteners (such as screws or nails) to secure a stud (e.g., stud 2a) to the arm 24a. As shown in FIG. 3A, the fastener openings 22 of a first row $r_1$ can be staggered along the width of the arm 24a relative to the fastener openings 22 of a second row $r_2$. For example, the horizontal spacing between a fastener opening 22 on the first row $r_1$ and an adjacent staggered fastener opening 22 on the second row $r_2$ can be in a range of 0.5 inches to 1.5 inches, e.g., about 1 inch. In other embodiments, the horizontal spacing between a fastener opening 22 on the first row $r_1$ and an adjacent staggered fastener opening 22 on the second row $r_2$ can be in a range of 0.15 inches to 0.75 inches, e.g., in a range of 0.2 inches to 0.6 inches. Further, the horizontal spacing between adjacent fastener openings 22 on a particular row $r_n$ can be in a range of 0.5 inches to 2.5 inches, e.g., about 2 inches. In some embodiments, the horizontal spacing between adjacent fastener openings 22 on a particular row $r_n$ can be in a range of 0.2 inches to 0.6 inches. The row spacing vertically between adjacent rows $r_{n-1}$ and $r_n$ along the height of the bracket 3 can be in a range of 0.2 inches to 1.5 inches, e.g., about 0.5 inches in some embodiments. The center-to-center spacing of the openings 22 may be related to the load capacity which the fasteners can carry. For example, in some arrangements, it may be desirable to space the openings from one another by at least a minimum fastener spacing so that the fasteners can act at their full load capacity.

Figure 3B:
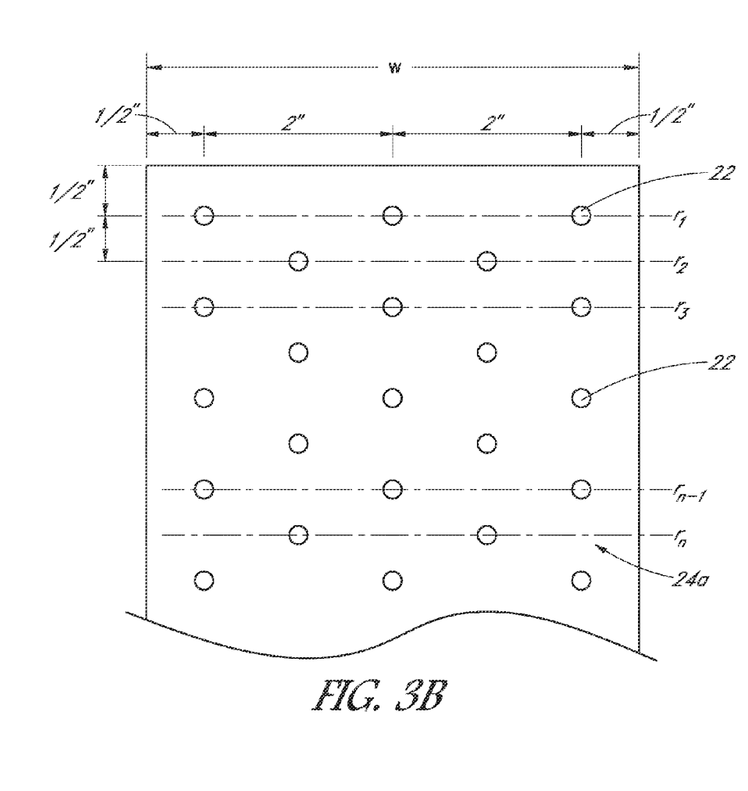
FIG. 3B is a side view of a portion of an arm of a bracket, according to another embodiment.

FIG. 3B is a side view of a portion of an arm 24a of a bracket 3, according to another embodiment. In particular, the bracket 3 of FIG. 3B can have a width of about 5 inches and can have a plurality of rows $r_1 \ldots r_n$ of fastener openings 22. The fastener openings 22 can be sized and shaped to receive fasteners (such as screws or nails) to secure the stud 2a to the arm 24a. As shown in FIG. 3B, the fastener openings 22 of a first row $r_1$ can be staggered along the width of the arm 24a relative to the fastener openings 22 of a second row $r_2$. For example, the horizontal spacing between a fastener opening 22 on the first row $r_1$ and an adjacent staggered fastener opening 22 on the second row $r_2$ can be in a range of 0.5 inches to 1.5 inches, e.g., about 1 inch. Further, the horizontal spacing between adjacent fastener openings 22 on a particular row $r_n$ can be in a range of 0.5 inches to 2.5 inches, e.g., about 2 inches. The row spacing vertically between adjacent rows $r_{n-1}$ and $r_n$ along the height of the bracket 3 can be in a range of 0.2 inches to 1.5 inches, e.g., about 0.5 inches in some embodiments.

Figures 4A, 4B, 4C:
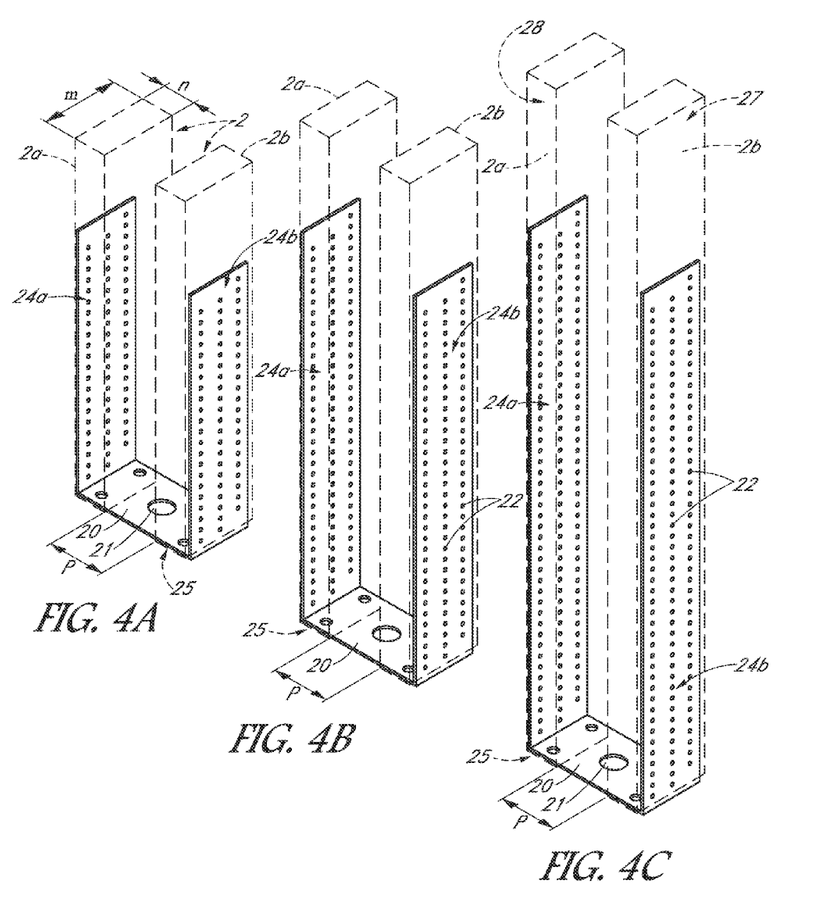
FIG. 4A-4C are schematic perspective views showing the brackets of FIGS. 2A-2C connected to respective pairs of studs.

FIG. 4A-4C are schematic perspective views showing the brackets 3 of FIGS. 3A-3C connected to respective pairs 2 of studs 2a, 2b. As shown in FIGS. 4A-4C, each stud 2a, 2b can include opposing major side surfaces 27 and opposing minor side surfaces 28. The major side surfaces 27 are larger than the minor side surfaces 28. For example, the side surfaces 27, 28 of each stud 2a, 2b can define dimensions n×m, with m>n. As one example, a 2×4 stud may have dimensions of about 1.5 inches by 3.5 inches, where n=1.5 inches and m=3.5 inches. In other embodiments, n may equal m, such as in the case of 4×4 posts or studs such that all side surfaces can have approximately the same surface area and width. In FIGS. 4A-4C, the arms 24a, 24b abut and mechanically connect to major side surfaces 27 of the studs 2a, 2b. For example, the arms 24a, 24b can abut and connect to outer side surfaces 27 of the pair 2 of studs 2a, 2b, which outer surfaces face away from one another. In other embodiments, however, the arms can be configured to abut and connect to the minor side surfaces of the studs, where the studs are oriented at 90° relative to the illustrated orientations.

The arms 24a, 24b can be spaced so as to provide a desirable stud spacing p between each pair 2 of studs 2a, 2b, e.g., between opposing inner surfaces 27 of the studs 2a, 2b. For example, the stud spacing p can be in a range of 1 inch to 8 inches, in a range of 2 inches to 4 inches, e.g., about 3 inches in some embodiments. In some arrangements, the stud spacing p can be in a range of 4 inches to 7 inches. The spacing p of the studs 2a, 2b can be sufficiently large to accommodate the rod 4 (FIG. 1) or other tie member therebetween for securing the studs 2a, 2b and bracket 3 to the building 1, with sufficient leeway to allow hand or tool tightening of a nut on the rod 4. In the embodiments of FIGS. 4A-4C, end surfaces 25 of the studs 2a, 2b abut the base section 20 of the bracket 3. However, it should be appreciated that a plate washer 7 (FIGS. 5A-5C) may intervene between the base section 20 and the end surfaces 25 of the studs 2a, 2b, as explained in detail herein.

Figure 5A:
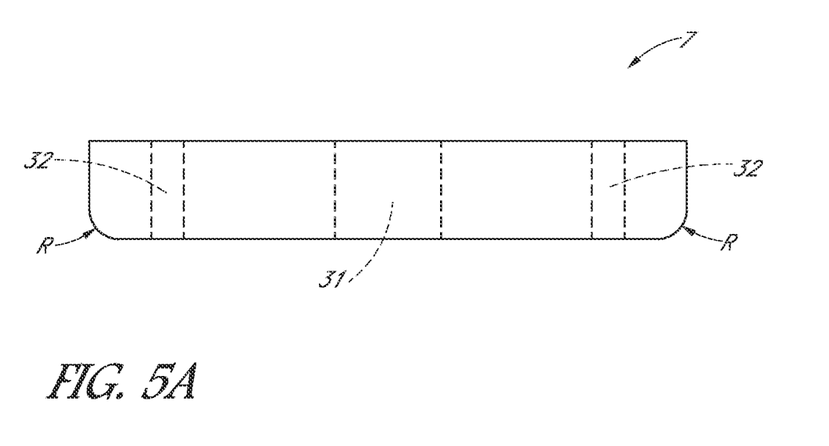
FIG. 5A is a schematic side view of a plate washer, according to one embodiment.
Figure 5B:
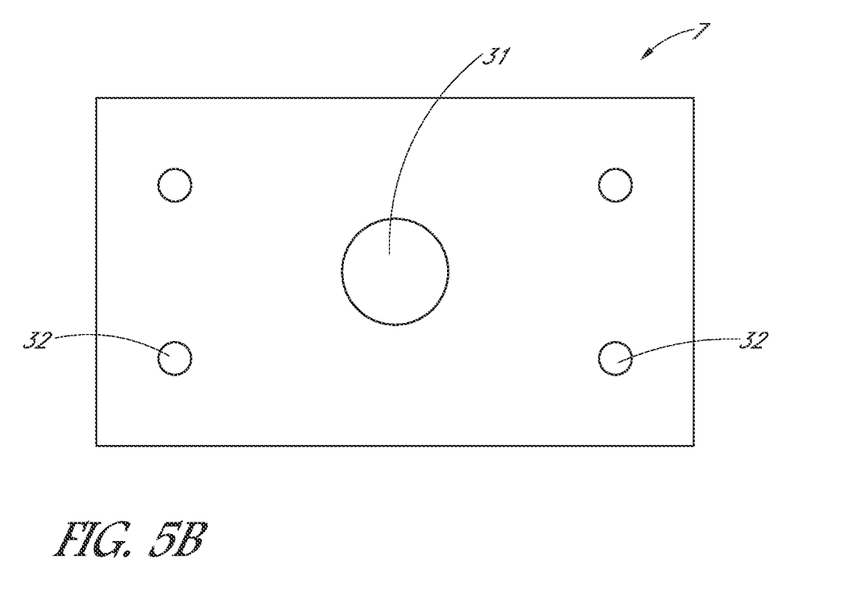
FIG. 5B is a top plan view of the plate washer of FIG. 5A.
Figure 5C:
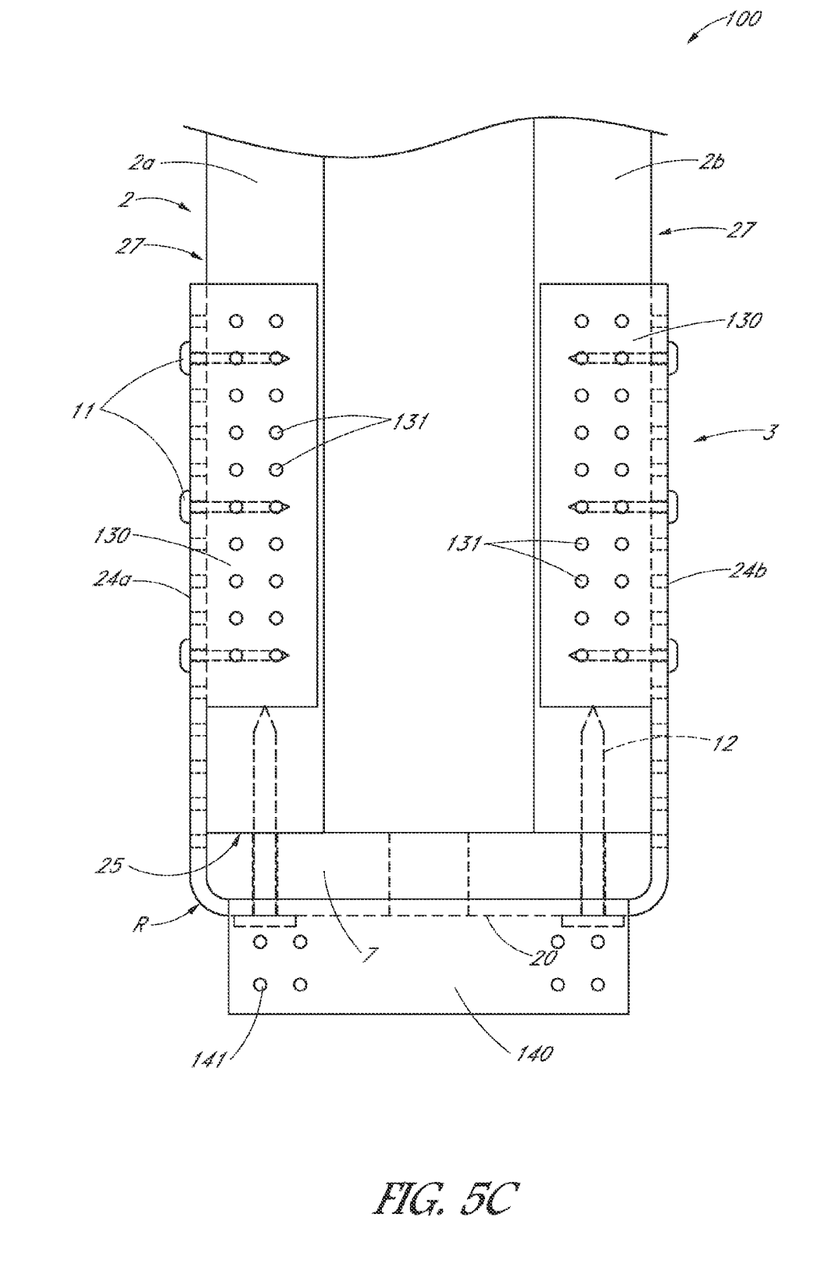
FIG. 5C is a schematic side sectional view of a portion of a frame before being incorporated into a building, according to one embodiment.
Figure 7:
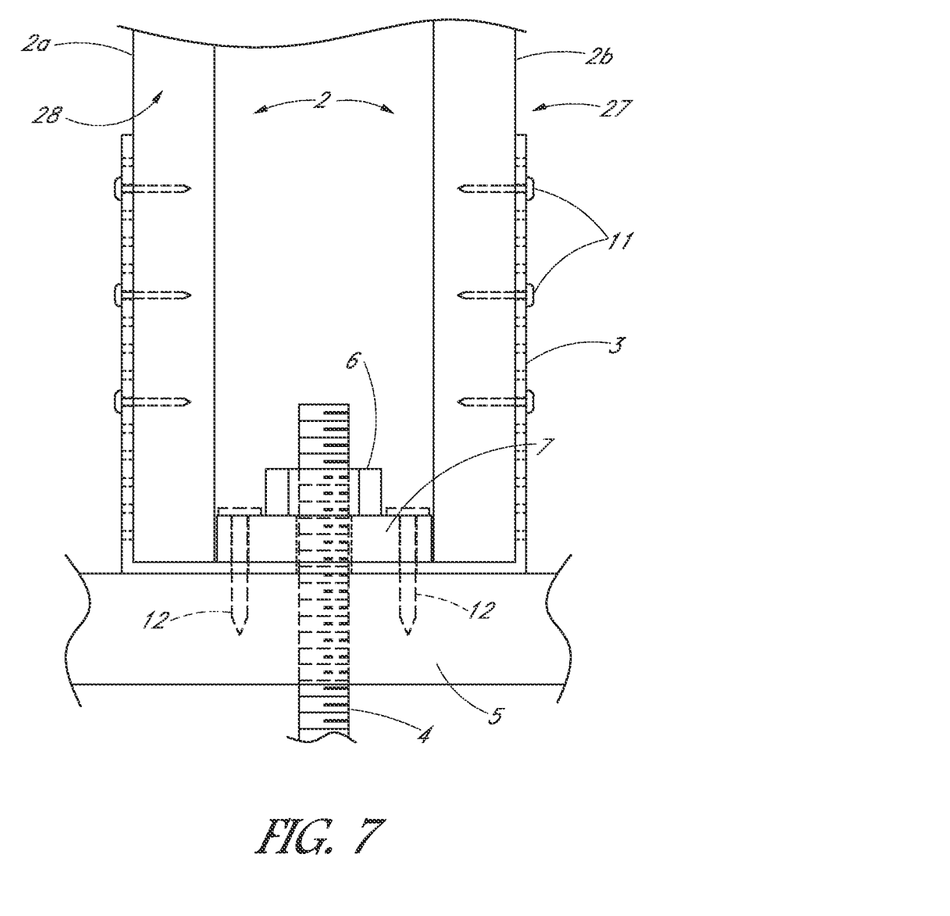
FIG. 7 is a schematic side sectional view of a portion of a frame incorporated into a building, according to another embodiment.

FIG. 5A is a schematic side view of the plate washer 7, according to one embodiment. FIG. 5B is a top plan view of the plate washer 7 of FIG. 5A. The plate washer 7 can be sized and shaped to be positioned between the arms 24a, 24b of the bracket 3. In some embodiments, the end surfaces 25 of the studs 2a, 2b can bear against the plate washer 7, as shown in FIG. 5C. The plate washer 7 can thereby bear the load of the building 1 as transmitted by the studs 2a, 2b. In such embodiments, the plate washer 7 can be suitably sized so as to extend underneath the spaced apart studs 2a, 2b between the arms 24a, 24b of the bracket 3. In other embodiments, the plate washer 7 can be sized to be disposed between the two studs 2a, 2b, as shown in FIG. 7. In some embodiments, the plate washer 7 may not be used. In some embodiments, the base section 20 may be thickened, roughened, or corrugated to support the studs.

In the illustrated embodiment of FIG. 5A, the plate washer 7 can have a bottom edge which forms a curved fillet having a radius R. In other arrangements, the plate washer 7 can have a bottom edge which forms a right angle (or an angled edge disposed at another angle) with the sides of the plate washer 7. The plate washer 7 can have a plurality of fastener openings 32 for receiving fasteners (e.g., screws or nails) which secure the plate washer 7 to the base section 20 of the bracket 3 and/or the end surfaces 25 of the studs 2a, 2b. In other embodiments, however, the plate washer 7 may not connect to the bracket. Rather, in some embodiments, the studs 2a, 2b may rest on the plate washer 7 without being positively fastened to the plate washer 7. A connector aperture 31 can be provided through a central portion of the plate washer 7. The connector aperture 31 can be sized and shaped to receive the rod 4, e.g., any of the rods 4a-4c of FIG. 1. The plate washer 7 can comprise a metal, such as stainless steel (e.g., a low carbon steel such as ASTM A36). In the illustrated embodiments, the plate washer 7 can be separate from the bracket 3. However, in other embodiments, the plate washer can be integrally formed with and form part of the bracket. In such an embodiment, for example, the plate washer can comprise a thickened base section of the bracket and can be manufactured as part of the bracket as a single piece. For example, in some embodiments, the base section 20 of the bracket can comprise a corrugated base 20A (see FIG. 2A, in which shading schematically represents corrugated material) to eliminate the plate washer.

FIG. 5C is a schematic side sectional view of a portion of a frame 100 before being incorporated into a building, according to one embodiment. To assemble the portion of the frame 100 in FIG. 5C, also referred to herein as a frame member, the plate washer 7 can be positioned against the base section 20 of the bracket 3 between the first and second arms 24a, 24b. The studs 2a, 2b can also be positioned within the bracket 3 between the arms 24a, 24b such that the first stud 2a abuts against the first arm 24a and the second stud 2b abuts against the second arm 24b. The end surfaces 25 of the studs 2a, 2b can abut against the top surface of the plate washer 7. One or more plate washer fasteners 12 can pass through the plate washer 7 and base section 20 to connect the plate washer 7 to the end surfaces 25 of the studs 2a, 2b. Although fasteners are shown as passing through the plate washer 7 and the bracket 3 to the studs 2a, 2b, in other embodiments, the plate washer may not positively connect or fasten to studs 2a, 2b. In the illustrated embodiment, the fasteners 12 can pass through the openings 33 (see FIG. 2A) of the base section 20 of the bracket 3, the fastener openings 32 (see FIG. 5A) of the plate washer 7, and into the end surfaces 25 of the studs 2a, 2b to fasten together the studs 2a, 2b, the plate washer 7, and the bracket 3. The plate washer fasteners 12 can be any suitable fastener, such as a nail or screw.

In addition, one or more stud fasteners 11 can be provided to fasten the arms 24a, 24b to respective studs 2a, 2b. For example, although not illustrated in FIG. 5C, the stud fasteners 11 can pass through the fastener openings 22 (see FIG. 3A) of the arms 24a, 24b and can engage with the outer major side surfaces 27 of the respective studs 2a, 2b. The stud fasteners 11 can be any suitable fastener, such as a nail or screw. The stud fasteners 11 can support shear loads induced by building forces. As shown in FIG. 5C, the arms 24a, 24b can directly connect to outer side surfaces of the studs 2a, 2b, which outer surfaces face away from one another. Furthermore, in some embodiments, additional flange fasteners (not illustrated), such as screws, nails, etc., may be used to connect the flanges 130 to the outer minor side surfaces 28 of the studs 2a, 2b by way of the flange openings 131. The additional flange fasteners can further enhance the load capacity of the frame member. In other embodiments, the bracket 3 may not include a flange 130 (see FIGS. 2A-2C).

Figure 5D:
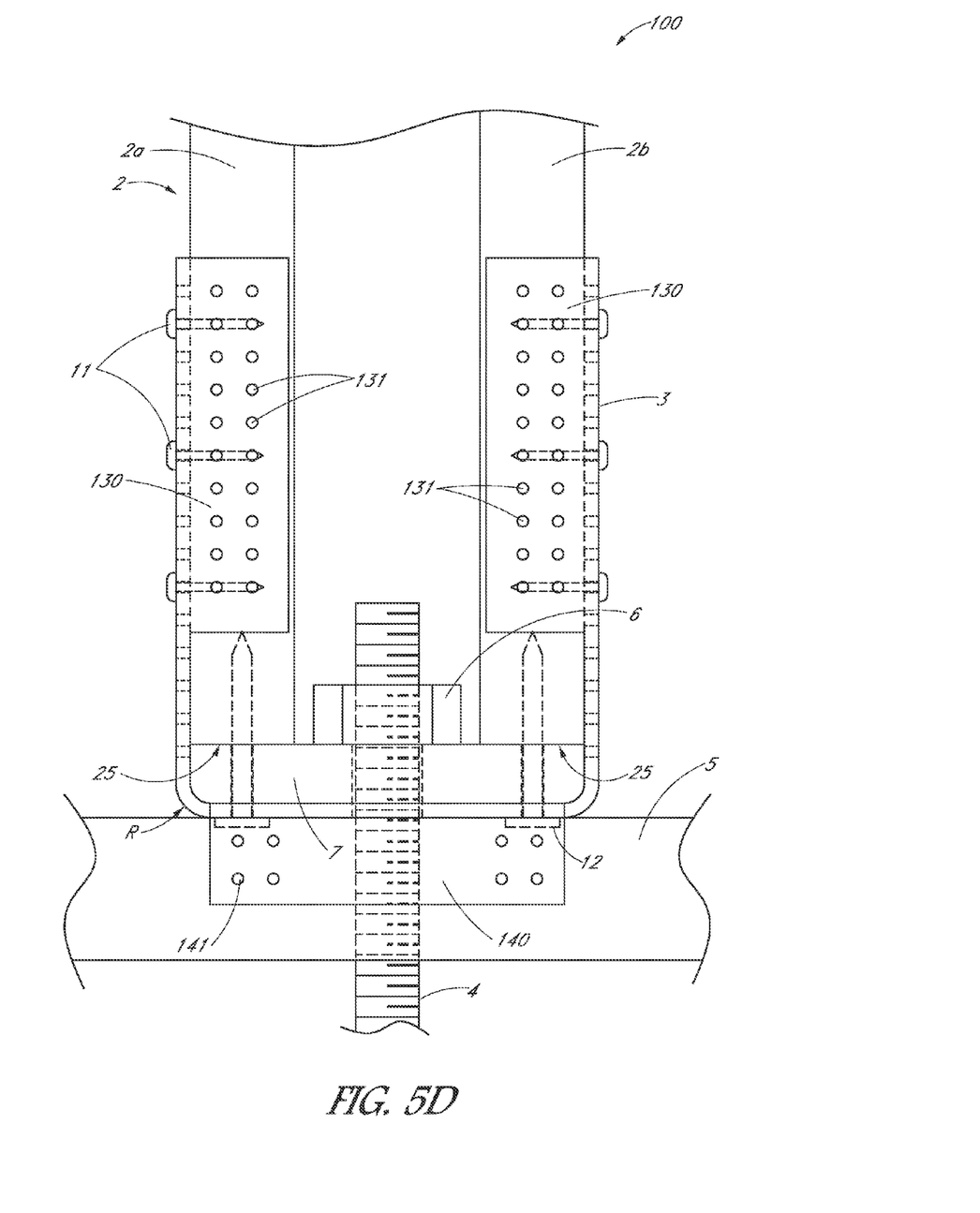
FIG. 5D is a schematic side sectional view of the portion of the assembled frame after being incorporated into a building.

FIG. 5D is a schematic side sectional view of the portion of the assembled frame 100, also referred to herein as a frame member, after being connected to a horizontal building member or sill and installed into a building. As shown in FIG. 5D, the bracket 3 and studs 2a, 2b can be secured to a sill such as a lower sill 5, which may form a portion of the frame member (such as a wall element). The horizontal building member or sill (such as a wood or steel beam) can be laid along a foundation of the building. In other arrangements, the bracket 3 can connect directly to a concrete, foundation by way of the tie member (e.g., rod or cable). As shown in FIG. 5D, the bracket 3 can connect to the sill 5 by way of the tabs 140 (see FIG. 2D). For example, tab fasteners (not shown), such as nails, screws, etc., can be inserted through the tab apertures 141 of the tab 140. Disposing the tabs 140 along the side of the bracket can enable the installer to easily secure the bracket 3 to the horizontal building element (e.g., the sill 5).

Although the bracket 3 shown in FIG. 5D is illustrated as being secured to a lower sill 5, it should be appreciated that the bracket 3 may instead be secured to upper sill 9 (such as that shown in FIG. 1). In FIG. 5D, the rod 4 can pass through the connector aperture 31 (see FIG. 5A) of the plate washer 7 and the aperture 21 of the bracket 3, and can extend through the lower sill 5 and into the underlying building structure. The connector 6 (such as a nut) can be threaded over the end portion of the rod 4 and can be tightened to secure the bracket 3 and studs 2a, 2b to the underling building structure or to corresponding bracket 3 and studs 2a, 2b of another story of the building.

In some embodiments, the sill (e.g., the lower sill 5 or an upper sill 9) can be secured to the bracket 3 prior to installation in the building. For example, the sill can be fastened to the bracket 3 with suitable fasteners through the tab openings 141 of the tabs 140, or similar additional openings, and can subsequently be installed in the building as a unit with the bracket 3, plate washer 7, and studs 2a, 2b.

In other embodiments, the horizontal building member can be connected to the bracket 3 during installation in the building.

Figure 6A:
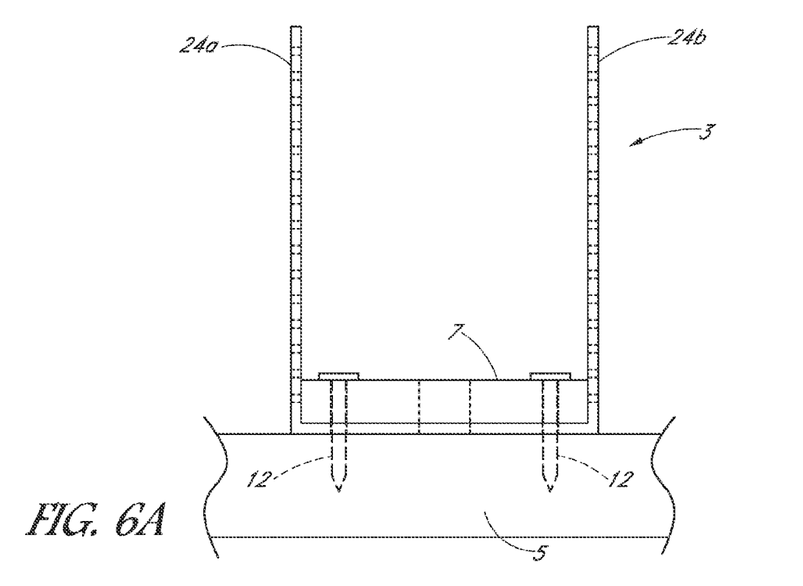
FIGS. 6A-6B are schematic side sectional views of a portion of a frame during assembly of the frame.
Figure 6B:
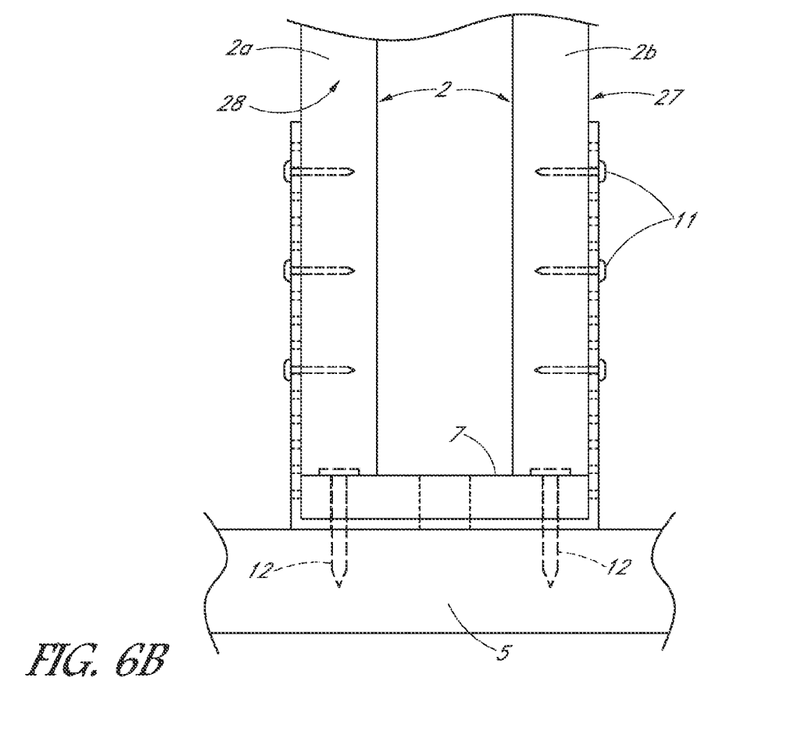

FIGS. 6A-6B are schematic side sectional views of a portion of a frame 100 during assembly of the frame 100, according to some embodiments. In the embodiment of FIG. 6A, for example, the bracket 3, plate washer 7, and lower sill 5 (which may alternatively be an upper sill 9) may be assembled prior to installation in the building. For example, one or more plate washer fasteners 12 can pass through the fastener openings 32 (FIG. 5A) of the plate washer 7 and the openings 33 (see FIG. 2A) of the bracket 3 and can engage with the lower sill 5. In FIG. 6B, the studs 2a, 2b can be positioned between the arms 24a, 24b, and the end surfaces 25 of the studs 2a, 2b can abut against the plate washer 7. As with the embodiment of FIGS. 5C-5D, one or more stud fasteners 11 can pass through the fastener openings 22 (see FIG. 3A) of the arms 24a, 24b and can engage with the major surfaces 27 of the studs 2a, 2b. As with FIGS. 5C-5D, the major surfaces 27 which directly connect to and abut the arms 24a, 24b can face away from one another.

Figure 6C:
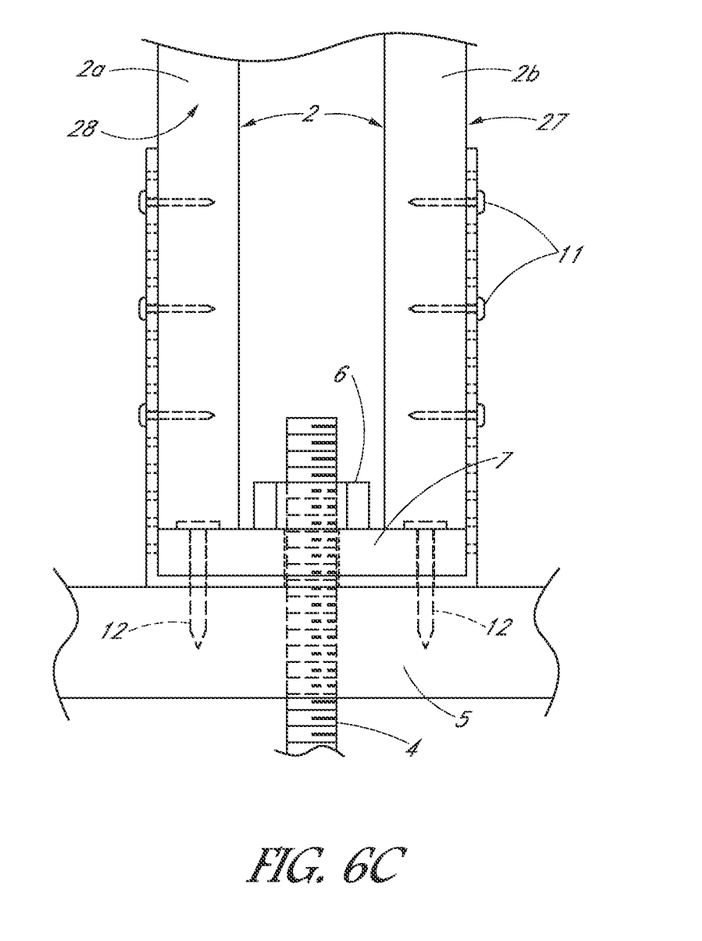
FIG. 6C is a schematic side sectional view of the portion of the frame after being incorporated into a building.

FIG. 6C is a schematic side sectional view of the portion of the frame 100 after being incorporated into a building. As with the embodiment of FIG. 5D, the tie member (e.g., the rod 4) can be inserted through the connector aperture 31 (FIG. 5A) of the plate washer and the aperture 21 of the base section 20. The rod 4 can extend through the building to another story of the building, which may be adjacent or non-adjacent to the story on which the bracket 3 shown in FIG. 6C is disposed. The connector 6 (e.g., a nut) can be tightened to further secure the rod 4 to the bracket 3 and lower sill 5.

FIG. 7 is a schematic side sectional view of a portion of a frame 100 incorporated into a building, according to another embodiment. The embodiment of FIG. 7 is similar to that shown in FIG. 6C, except the plate washer 7 is disposed between the studs 2a, 2b, rather than abutting the end surfaces 25 of the studs 2a, 2b. Fasteners 12 can extend through openings in the plate washer 7, similar to the openings 32 shown in FIG. 5A, and into the adjacent sill. As with FIG. 6A, the rod 4 can extend through the connector aperture 31 (see FIG. 5A) of the plate washer 7 and the aperture 21 (see FIG. 2A) of the base section 20 of the bracket 3. The connector 6 can be tightened to secure the plate washer 7 and bracket 3 to the lower sill 5.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

The invention claimed is:

1. A frame for a building, the frame comprising:
   a tie member;
   a bracket comprising a base section and first and second arms extending transversely from the base section, the first and second arms spaced apart from one another, the base section comprising an aperture sized and shaped to receive a tie member; and
   a pair of studs spaced from one another by an intervening gap sized to receive the tie member between the pair of studs, the pair of studs disposed between the first and second arms, an outer side surface of a first stud of the pair of studs connected to the first arm and an outer side surface of a second stud of the pair of studs connected to the second arm,
   wherein each of the first and second studs comprises a major side surface and a minor side surface, the outer side surface of the first stud comprising the major side surface of the first stud and the outer side surface of the second stud comprising the major side surface of the second stud, wherein the first and second arms abut and connect to the respective major side surfaces of the first and second studs which face away from one another, and
   wherein the tie member extends substantially parallel to and is positioned between the first stud and the second stud, the tie member passing through the aperture of the base section and the intervening gap.

2. The frame of claim 1, further comprising a horizontal building member coupled with the bracket by way of one or more fasteners.

3. The frame of claim 2, wherein the tie member extends into the horizontal building member.

4. The frame of claim 3, wherein a first end portion of the tie member is disposed on one story of the building and a second end portion of the tie member is disposed on another story of the building, the first end portion of the tie member engaging the bracket, the second end portion of the tie member engaging a second bracket.

5. The frame of claim 3, wherein the tie member extends through at least a portion of two adjacent stories of the building.

6. The frame of claim 5, wherein the tie member extends through at least a portion of three stories of the building.

7. The frame of claim 1, further comprising a plate washer disposed on the base section between the first arm and the second arm, wherein ends of the studs bear against the plate washer.

8. The frame of claim 7, further comprising a plurality of plate fasteners connecting the plate washer to the ends of the studs.

9. The frame of claim 1, wherein the base section of the bracket comprises a corrugated portion which bears against the studs.

10. The frame of claim 1, further comprising at least one of: a tab extending downwardly from the base section and comprising one or more tab apertures, and a flange extending inwardly from an outer end of the first arm towards the second arm and comprising one or more flange openings.

11. The frame of claim 1, further comprising a plurality of fasteners connecting the first arm to the first stud.

12. The frame of claim 1, wherein the first arm and second arm are spaced apart by a separation distance in a range of 4 inches to 27 inches.

13. The frame of claim 12, wherein the separation distance is in a range of 5 inches to 8 inches.

14. The frame of claim 1, wherein the frame is installed in the building.

15. The frame of claim 1, wherein the base section comprises a planar sheet having a thickness in a range of ⅛ inch to 1 inch.

16. The frame of claim 1, wherein the base section includes a plurality of base fastener openings to receive fasteners therethrough, each of the plurality of base fastener openings smaller than the aperture.

17. The frame of claim 16, wherein a first base fastener opening of the plurality of base fastener openings is in a first region between the first arm and the aperture and a second base fastener opening of the plurality of base fastener openings is in a second region between the second arm and the aperture.

18. The frame of claim 1, wherein each of the first arm and the second arm comprises a plurality of rows of the fastener openings, the rows spaced apart along a height of the respective arm by a row spacing.

19. The frame of claim 1, wherein a height of the first arm is greater than a separation distance between the first arm and the second arm, and wherein the height of the first arm is greater than a width of the first arm.

20. The frame of claim 1, wherein widths of the first arm and the second arm are in a range of 2 inches to 8 inches.

21. A method of manufacturing a building, the method comprising:
inserting first and second studs between first and second arms of a bracket, the first and second arms extending from a base section of the bracket, each of the first and second studs comprising a major side surface and a minor side surface;
spacing the first and second studs from one another such that there is an intervening gap defining a stud spacing between respective inner side surfaces of the first and second studs, the intervening gap sized to receive a tie member between the first and second studs;
securing an outer side surface of the first stud to the first arm, the outer side surface of the first stud comprising the major side surface of the first stud;
securing an outer side surface of the second stud to the second arm, the outer side surface of the second stud comprising the major side surface of the second stud; and
inserting the tie member through an aperture of the base section and the intervening gap such that the tie member extends substantially parallel to and is positioned between the first stud and the second stud,
wherein the first and second arms abut and connect to the respective major side surfaces of the first and second studs which face away from one another.

22. The method of claim 21, further comprising positioning a plate washer between the first and second arms of the bracket such that the plate washer abuts the base section.

23. The method of claim 21, further comprising engaging a connector coupled with the tie member to secure the bracket to a horizontal building member of the building.

24. The method of claim 23, further comprising extending the tie member through the horizontal building member such that a first end portion of the tie member is disposed on one story of the building and a second end portion of the tie member is disposed on another story of the building, the first end portion of the tie member engaging the bracket and the plate washer, the second end portion of the tie member engaging a second bracket and a second plate washer.

25. The method of claim 24, further comprising extending the tie member through the horizontal building member such that the tie member extends through at least a portion of two adjacent stories of the building.

26. The method of claim 25, further comprising extending the tie member through the horizontal building member such that the tie member extends through at least a portion of three stories of the building.

27. A frame for a building, the frame comprising:
a tie member;
a bracket comprising a base section and first and second arms extending transversely from the base section, the first and second arms spaced apart from one another, the base section comprising an aperture;
a horizontal building member coupled with the bracket;
a plate washer disposed on and coupled with the base section of the bracket, the plate washer comprising a connector aperture; and
first and second studs spaced apart from one another by an intervening gap sized to receive the tie member, the first and second studs disposed between the first and second arms,
wherein each of the first and second studs comprises a major side surface and a minor side surface, wherein the first and second arms abut and connect to the respective major side surfaces of the first and second studs which face away from one another, and
wherein the tie member extends substantially parallel to and positioned between the first and second studs within the intervening gap, the tie member passing through the aperture of the base section, through the connector aperture of the plate washer, and into the horizontal building member.

28. The frame of claim 27, further comprising a plurality of plate washer fasteners connecting the bracket with the plate washer through a plurality a plate washer openings.

29. The frame of claim 27, wherein the first arm and the second arm are spaced apart by a separation distance in a range of 5 inches to 11 inches.

30. The frame of claim 27, further comprising at least one of: a tab extending downwardly from the base section and comprising one or more tab apertures, and a flange extending inwardly from an outer end of the first arm towards the second arm and comprising one or more flange openings.

\* \* \* \* \*